3,849,570
METHOD OF TREATING CARDIAC ARRHYTHMIA WITH 2-(2'-DIETHYLAMINOETHYL) - 3-PHENYL-PHTHALIMIDINE AND ITS SALTS
Manfred Raschack, Darmstadt, and Oskar Bub, Ludwigshafen, Germany, assignors to Knoll A.G. Chemische Fabriken, Ludwigshafen (Rhine), Germany
No Drawing. Filed Mar. 6, 1973, Ser. No. 338,546
Claims priority, application Germany, Apr. 1, 1972,
P 22 16 065.2
Int. Cl. A61k 27/00
U.S. Cl. 424—274                    2 Claims

ABSTRACT OF THE DISCLOSURE

The method of treating cardiac arrhythmia which comprises administering 2-(2'-diethylaminoethyl)-3-phenyl-phthalimidine and/or salts thereof with physiologically tolerable acids.

Dosage unit forms for such administration.

The present invention relates to a method for treating disturbances of the cardiac rhythm and to dosage unit forms therefor.

German patent publication 1,135,461, published Aug. 30, 1962, teaches 2-(2'-diethylaminoethyl)-3-phenyl-phthalimidine and its methosulfate. The publication further reports that these substances possess good local anaesthetic, spasmolytic, and anti-tussive properties. Further, methods for the preparation of these compounds are described.

It has now been found that 2-(2'-diethylaminoethyl)-3-phenyl-phthalimidine (hereafter DPP), as well as its salts with physiologically tolerable acids, are outstanding agents for the treatment of life-threatening disturbances of the cardiac rhythm.

A feature of the invention is a new method for the treatment of disturbances of the cardiac rhythm with DPP and/or its salts with physiologically tolerable acids.

A further feature of the invention are dosage unit forms for use in such treatment.

The dosage unit forms of the invention are prepared by combining DPP and/or its salts with conventional pharmaceutical excipients to form tablets, dragées, capsules, or solutions in a known fashion.

As physiologically tolerable acids, hydrochloric acid, sulfuric acid, phosphoric acid, fumaric acid, maleic acid, succinic acid, tartaric acid, and citric acid can be mentioned as examples.

The superiority of the method of the invention for the treatment of cardiac arrhythmia in mammals was determined by the following experimental arrangements. If rats are continuously infused with an aconitine nitrate solution, an electrocardiogram shows serious disturbances in the cardiac rhythm such as extrasystoles, ventricular automatism, and ventricular fibrillation which finally lead to the death of the test animals. By pre-treatment of the test animals (about 10–20 animals per test) with the substances to be tested, the appearance of the disturbances in the cardiac rhythm can be hindered or, on continuous administration of aconitine, considerably delayed [Haas et al., Arzneimittel-Forschung 18, 401–407 (1968); Haas et al., Arzneimittel-Forschung 21, 1392–1399 (1971)].

Tables 1 and 2 below show the superior effect of DPP in the case of the phosphate.

Table 1 below shows the results of a test of antiarrhythmic properties in arrhythmia induced in the rat by aconitine. In column A are given the average values, $\bar{x}$, of the aconitine doses which led to the first appearance of extrasystoles (I), ventricular automatism (II), and ventricular fibrillation (III). In column B are given the average values for aconitine doses which led to t appearance of the same phenomenon after prior admin tration of 40 mg./kg. p.o. of DPP phosphate. (The dime sion of $\bar{x}$ is µg./kg.).

Table 2 gives those doses of DPP phosphate and procainamide, in mg./kg., after the administration which the amount of aconitine required to be admin tered to produce the appearance of extrasystoles (I), ve tricular automatism (II), and ventricular fibrillation (II is increased by 50 percent in comparison with an u treated control group. These effective doses are calculat from statistically reliable linear regression functions f the dose-effect relationship [cf. Lindner, "Statistic Methoden," 3rd Edition, Birkhauser Verlag, Ba: (1960)].

TABLE 1

|   |   | I | II | III |
|---|---|---|----|-----|
| A | $\bar{x}$ | 28 | 35 | 59 |
|   | Number of animals | 17 | 20 | 19 |
| B | $\bar{x}$ | 47 | 76 | 143 |
|   | Number of animals | 12 | 12 | 12 |

TABLE 2

|   | I | II | III |
|---|---|----|-----|
| DPP phosphate | 29 | 23 | 22 |
| Procainamide | 257 | 198 | 257 |

Table 1 shows that DPP can be employed very well f the treatment of disturbances of the cardiac rhyth: From Table 2 it can be seen that DPP is many tin superior to procainamide. Thus, for oral administratic the material is 9–12 times more active than procainami (cf. Table 2). The same is true for its effect after intra\ nous administration.

Further, DPP is capable of combatting ventricul arrhythmia following coronary insufficiency or infarctic for example as observed in the conscious dog after pri stenosis of the coronary arteries.

Also, it has been found that DPP has fewer si effects when compared with procainamide. Thus, in c culatory experiments in the cat it has been shown tl procainamide, in comparison to DPP, much more stron§ lowers the heartbeat, the systolic pressure and the ma: mum rate of increase of systolic pressure in the l( ventricle, and the peripheral blood pressure, in an u desirable manner. In addition, the therapeutic breadth DPP is larger in comparison with that of procainamide the differences between the antiarrhythmic effective dos and the lethal doses of the two compounds are compare Finally, DPP is very well resorbed.

DPP and its salts with physiologically tolerable aci acids should be administered orally and parenterally. T dose should be about 2–10 mg./kg. per day (or abo 200–300 mg. per day per patient) for oral administrati and about 0.1–1.0 mg./kg. per day (or about 20–30 π per day per patient) for intravenous or intramuscul administration. For oral administration, the well knov galenic preparation form such as tablets, dragées, a capsules are suitable. Each dosage unit form suitat contains about 30–100 mg. of active ingredient. Ampul of about 2–5 ml. in volume and containing from abo 5–50 mg. each of effective ingredient in a carrier su as physiological salt solution are convenient dosage ui forms for parenteral administration.

The duration of effectiveness of the oral administrati forms can be increased by the addition of material su as sodium alginate.

A better understanding of the present invention a: of its many advantages will be had by referring to t following specific examples, given by way of illustratio

EXAMPLE 1 ablets are prepared in a conventional manner in a ?t press each to have the following composition:

| | Mg. |
|---|---|
| ’ phosphate | 50.00 |
| ıstarch | 120.00 |
| : | 25.20 |
| rosil" (finely-divided silicic acid) | 1.50 |
| /l alcohol | 3.00 |
| ·istyl alcohol | 0.30 |
| Total | 200.00 |

EXAMPLE 2

) g. of DPP phosphate are dissolved in 500 ml. of ?r with the addition of sodium chloride so that a solu- isotonic with blood is formed. 5 ml. portions of the tion are placed into ampules and sterilized.

EXAMPLE 3 ablets each of the following composition are prepared tablet press in the conventional manner:

| | Mg. |
|---|---|
| ‹ | 30.00 |
| ıstarch | 120.00 |
| : | 25.20 |
| :ly-divided silicic acid ("Aerosil") | 1.50 |
| /l alcohol | 3.00 |
| ·istyl alcohol | 0.30 |
| Total | 180.00 |

EXAMPLE 4

Tablets each of the following composition are prepared in a tablet press in the conventional manner:

| | Mg. |
|---|---|
| DPP hydrochloride | 80.00 |
| Cornstarch | 210.00 |
| Talc | 42.10 |
| Finely-divided silicic acid ("Aerosil") | 2.40 |
| Cetyl alcohol | 5.00 |
| Myristyl alcohol | 0.50 |
| Total | 340.00 |

It is claimed:

1. The method of treating cardiac arrhythmia in a patient suffering therefrom which comprises orally administering to said patient about 200–300 mg. per day of a member selected from the group consisting of 2-(2'-diethylaminoethyl)-3-phenyl-phthalimidine and salts thereof with physiologically tolerable acids.

2. The method of treating cardiac arrhythmia in a patient suffering therefrom which comprises parenterally administering to said patient about 20–30 mg. per day of a member selected from the group consisting of 2-(2'-diethylaminoethyl) - 3 - phenyl - phthalimidine and salts thereof with physiologically tolerable acids.

References Cited

Bub—Chem. Abst., vol. 58 (1963), p. 1412d.
Hanna—Chem. Abst., vol. 73 (1970), p. 23712e.

SAM ROSEN, Primary Examiner